(12) United States Patent
Huang et al.

(10) Patent No.: US 12,269,118 B2
(45) Date of Patent: Apr. 8, 2025

(54) LASER SOLDERING SYSTEM USING DYNAMIC LIGHT SPOT AND METHOD THEREOF

(71) Applicant: Delta Electronics, Inc., Taoyuan (TW)

(72) Inventors: Chun-Lien Huang, Taoyuan (TW);
Wen-Yu Chuang, Taoyuan (TW);
Keng-Ning Chang, Taoyuan (TW);
Ting-Yu Lu, Taoyuan (TW); Chun-Fei Kung, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 830 days.

(21) Appl. No.: 17/471,094

(22) Filed: Sep. 9, 2021

(65) Prior Publication Data

US 2022/0410312 A1 Dec. 29, 2022

(30) Foreign Application Priority Data

Jun. 25, 2021 (CN) .......................... 202110711033.7

(51) Int. Cl.
*B23K 26/06* (2014.01)
*B23K 1/005* (2006.01)
(Continued)

(52) U.S. Cl.
CPC ........ *B23K 26/0665* (2013.01); *B23K 1/0056* (2013.01); *B23K 26/034* (2013.01);
(Continued)

(58) Field of Classification Search
CPC .. B23K 26/0665; B23K 26/60; B23K 1/0056; B23K 26/034; B23K 26/0648; B23K 2101/42; B23K 26/703; B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/04;
(Continued)

(56) References Cited

U.S. PATENT DOCUMENTS

2013/0092666 A1* 4/2013 Oh ....................... B23K 26/037
219/121.64
2018/0272749 A1* 9/2018 Yamamoto ............ G06F 3/1259

FOREIGN PATENT DOCUMENTS

CN 200989750 Y 12/2007
CN 205147525 U 4/2016
(Continued)

OTHER PUBLICATIONS

Office Action dated Feb. 7, 2022 of the corresponding Taiwan patent application No. 110123294.
(Continued)

*Primary Examiner* — Phuong T Nguyen
(74) *Attorney, Agent, or Firm* — Chun-Ming Shih; HDLS IPR SERVICES

(57) ABSTRACT

A laser soldering system using dynamic light spot and a method thereof are provided. A laser module is controlled to radiate toward multi-lens to form a light spot on a soldering target for soldering, and a lens distance between the multi-lens is adjusted to adjust a light spot size. The disclosure may provide multiple heating densities respectively adequate to different soldering status via adjusting the light spot size when using same laser power, so as to improve the soldering quality.

9 Claims, 12 Drawing Sheets

(51) Int. Cl.
   *B23K 26/03* (2006.01)
   *B23K 26/60* (2014.01)
   *G05B 19/418* (2006.01)
   *B23K 101/42* (2006.01)

(52) U.S. Cl.
   CPC .......... *B23K 26/0648* (2013.01); *B23K 26/60* (2015.10); *G05B 19/41875* (2013.01); *B23K 2101/42* (2018.08); *G05B 2219/45026* (2013.01); *G05B 2219/45235* (2013.01)

(58) Field of Classification Search
   CPC ...... B23K 26/26; B23K 26/244; B23K 26/14; B23K 31/125; B23K 26/20; B23K 26/0066; B23K 26/0626; B23K 26/073; B23K 26/38; B23K 26/0619; B23K 26/0624; B23K 26/53; B23K 26/0006; B23K 26/0676; B23K 26/0861; B23K 2103/56; B23K 2101/40
   USPC .......... 219/121.63, 121.64, 121.72, 136, 119
   See application file for complete search history.

(56) References Cited

FOREIGN PATENT DOCUMENTS

| | | |
|---|---|---|
| CN | 108340088 A | 7/2018 |
| CN | 110681998 A | 1/2020 |
| CN | 111922513 A | 11/2020 |
| JP | 2013016703 A | 1/2013 |
| JP | 2013086180 A | 5/2013 |
| JP | 2013132655 A | 7/2013 |
| JP | 2020163413 A | 10/2020 |

OTHER PUBLICATIONS

Office Action dated Jul. 4, 2023 of the corresponding Japan patent application No. 2022-077471.
Office Action dated Sep. 5, 2023 of the corresponding Taiwan patent application No. 110123294.

* cited by examiner

LASER SOLDERING SYSTEM USING DYNAMIC LIGHT SPOT AND METHOD THEREOF

BACKGROUND

Technical Field

The present disclosure relates to a laser soldering, and more particularly related to a laser soldering system using dynamic light spot and a method thereof.

Description of Related Art

When performing the laser soldering method in the related art, the power of the laser module must be configured before a soldering stage (offline status), and the power is unable to be adjusted arbitrarily in the soldering stage (online status).

Besides, in the laser soldering method in the related art, the focal length of the lens is fixed, and thus the size of the light spot formed on a soldering target is also fixed. Namely, the effective heating range of the laser is unadjustable.

Therefore, the laser soldering method in the related art can only provide same heating energy density to weld the soldering target in the soldering stage, and the heating energy density of the light spot is unadjustable for different soldering events (such as the temperature of the soldering is too low or too high). The above deficiency lowers the soldering quality and causes a soldering failure.

The laser soldering method in the related art encounters the above-mentioned problem, a more effective solution is needed in the art.

SUMMARY

The present disclosure is direct to a laser soldering system using dynamic light spot and a method thereof having the ability to adjust the light spot size to change the heating energy density in a soldering stage.

In one of the embodiments, the laser soldering method includes steps of: executing a soldering to control a laser module to radiate toward a first lens and a second lens to form a light spot on a soldering target; and adjusting a lens distance between the first lens and the second lens based on a spot-adjustment condition to adjust a light spot size of the light spot when the spot-adjustment condition is met in the soldering stage.

In one of the embodiments, the laser soldering system includes a laser lens, an electric displacement module, a laser module, and a control module. The laser lens includes a first lens and a second lens. The laser module is used to radiate a laser beam toward the laser lens to form a light spot on a soldering target behind the laser lens. The control module is electrically connected to the laser module and the electric displacement module, configured to control the laser module to radiate, and control the electric displacement module to adjust the lens distance between the first lens and the second lens to adjust a light spot size of the light spot based on a spot-adjustment condition when the spot-adjustment condition is met in a soldering stage.

The disclosure can provide multiple heating densities respectively adequate to different soldering status via adjusting the light spot size when using same laser power, so as to improve the soldering quality.

BRIEF DESCRIPTION OF THE DRAWINGS

The features of the present disclosure believed to be novel are set forth with particularity in the appended claims. The present disclosure itself, however, may be best understood by referencing to the following detailed description of the present disclosure which describes an exemplary embodiment of the present disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

The disclosure is to provide a laser soldering system using dynamic light spot and a laser soldering method using dynamic light spot, that may determine a soldering status, and dynamically adjust a heating energy density by adjusting a distance between multiple lenses correspondingly in a laser soldering procedure, so as to provide a light spot size and a heating energy that are most suitable for the current soldering status and improve the soldering efficiency and the soldering quality.

Figure 1:
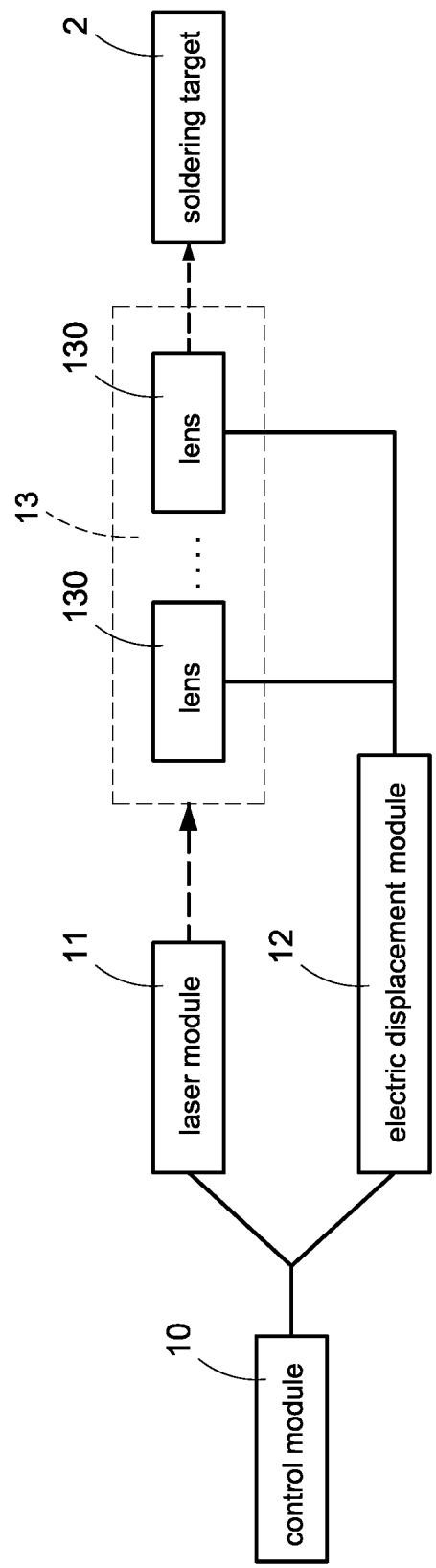
FIG. 1 is an architecture diagram of a laser soldering system of one embodiment of the present disclosure.

Please refer to FIG. 1, FIG. 1 is an architecture diagram of a laser soldering system of one embodiment of the present disclosure. The laser soldering system of this embodiment includes a laser module 11, an electric displacement module 12, a laser lens 13 and a control module 10 electrically connected to the laser module 11 and the electric displacement module 12.

The laser module 11 is a laser light source used to radiate single point laser having a high energy density as a heat source to melt a soldering material to cover and fix contacts of multiple components by the molten soldering material. The soldering material may be a soldering rod or a soldering powder, and may be made by tin, aluminum, steel, alloy, thermoplastic, etc.

The laser lens 13 includes a plurality of lenses 130. FIG. 1 takes two lenses 130 (a first lens and a second lens) for an example, but this specific example is not intended to limit the maximum number of the lenses of the present disclosure. The laser lens 13 is used to receive the laser radiated from the laser module 11, and guide the laser, by a reflection or a refraction, to a soldering target 2 (such as the above-mentioned contacts and/or soldering material) to form the light spot that is used to indicate a soldering zone.

The above-mentioned light spot size of the light spot is used to indicate an active heating zone of the laser, such as an actual irradiation zone of the laser heating energy, or a zone having a temperature exceeding a predetermined temperature (such as a melting temperature of the soldering material or other designated temperature) or a power ratio exceeding a predetermined power ratio (such as 10%, 50%, 90% or other designated ratio).

In the present disclosure, the electric displacement module 12 is connected to at least one of the lenses 130, and is enabled to adjust the lens distance between two designated lenses arranged along an optical path in a direction being parallel to an optical axis to increase or decrease the straight length of this optical path and adjust the focal length of the laser lens 13, so as to adjust the light spot size of the light spot formed on the soldering target 2. The optical path is a laser path started from the laser module 11, went through the laser lens 13, and terminated at the soldering target 2. The adjustment of the lens distance may be implemented by moving only one lens, or moving a plurality of lenses simultaneously.

Please be noted that when a machining parameter (such as a laser power parameter) of the laser module 11 is fixed (namely, the total laser power is constant), a larger light spot size (such as 3 mm of diameter) represents a lower heating energy density of each position within the light spot (lower heating power for each position). Moreover, a smaller light spot size (such as 0.8 mm of diameter) represents a higher heating energy density of each position within the light spot (higher heating power for each position).

Besides, the above-mentioned light spot size also relates to a curvature and a lens distance of the multiple lenses 130 of the laser lens 13.

The control module 10, such as a CPU, a GPU, a TPU, an MCU, a processor, etc. or any combination thereof, is used to control the laser soldering system.

Figure 2:
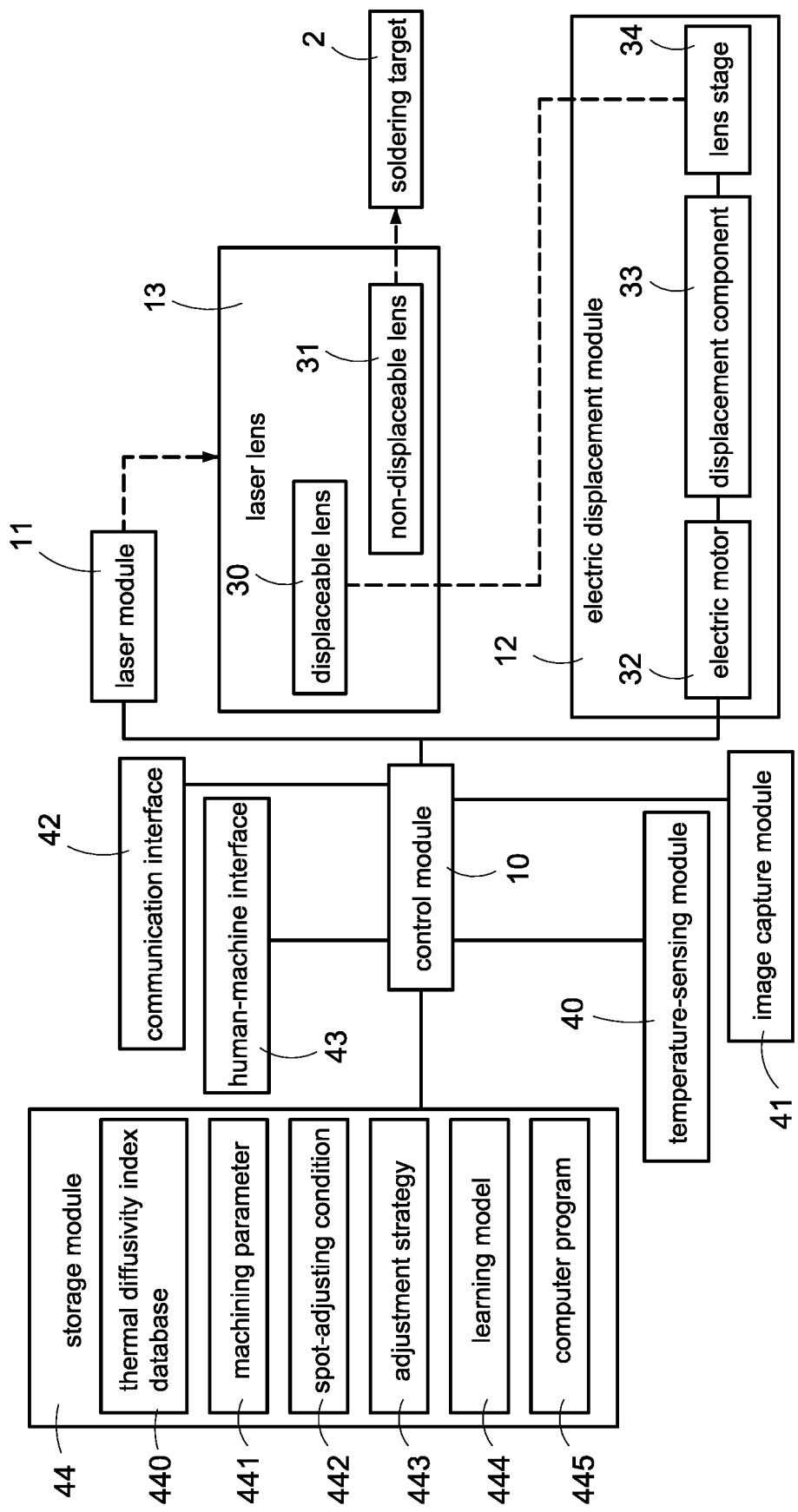
FIG. 2 is an architecture diagram of a laser soldering system of one embodiment of the present disclosure.

Please refer to FIG. 1 and FIG. 2 simultaneously, FIG. 2 is an architecture diagram of a laser soldering system of one embodiment of the present disclosure.

In the embodiment shown in FIG. 2, the electric displacement module 12 includes an electric motor 32, a displacement component 33 and one or more lens stage(s) 34.

The electric motor 32 supplies a motive power to the displacement component 33 through rotation. The displacement component 33, such as a slideway device or a guideway device, is used to move each of the lens stages 34 through the received motive power to adjust the lens distance between the lenses. Each of the lenses is fixedly arranged on the each of the lens stages 34 and is moved along with the lens stage 34 when the lens stage 34 is moved by the displacement component 33.

In one of the embodiments, the laser lens 13 includes one or more displaceable lens 30 and one or more non-displaceable lens 31. The non-displaceable lens 31 is fixedly arranged in the laser lens 13, and the arranged position of the non-displaceable lens 31 is unchangeable. The displaceable lens 30 is arranged on the lens stage 34 and is movable along with the lens stage 34.

By arranging a part of the lenses as displaceable and others as non-displaceable, the present disclosure may significantly reduce the probability of deviation of the optical axis due to the displacement of lenses, and also reduce the sensitivity of adjusting the light spot size.

In one embodiment, the laser lens 13 includes only one displaceable lens 30 and one fixed lens. Thus, the sensitivity of adjusting the light spot size may be minimized, and so as to precisely control the adjustment of the light spot size.

For example, the response ratio of the light spot size is small when only one displaceable lens 30 and one fixed lens are arranged, for example, the light spot may increase/decrease 1 mm when the displaceable lens 30 is moved for 1 mm. The response ratio of the light spot size is large when two or more displaceable lenses 30 or three or more lenses are arranged, for example, the light spot may increase/decrease 5 mm when the displaceable lens 30 is moved for 1 mm. It's hard to precisely adjust the light spot size if the response ration is too large.

In one embodiment, at least one lens or at least one surface of the lens is a convex lens (converging lens) to achieve the effect of laser-converging.

In one embodiment, the laser soldering system further includes a temperature-sensing module 40 electrically connected to the control module 10, such as an infrared laser thermometer, a thermal imager, etc. The temperature-sensing module 40 is used to sense a sensed temperature(s) of one or more position(s) of the soldering target 2.

In one of embodiments, the laser soldering system further includes an image capture module 41 electrically connected to the control module 10, the image capture module 41 is used to obtain an image of the soldering target 2 by photographing the soldering target 2.

In one embodiment, the image capture module 41 may be an RGB camera, and enables to take a color image (such as RGB image) of the soldering target 2.

In one embodiment, the image capture module 41 may be an infrared camera, and enables to take an infrared image of the soldering target 2.

In one embodiment, the image capture module 41 may be a thermal camera, and enables to take a thermal image of the soldering target 2.

In one embodiment, the laser soldering system further includes a communication interface 42 electrically connected to the control module 10, such as an Ethernet interface card, a Wi-Fi network interface card, a Bluetooth module, a cellular network module, etc. The communication interface 42 may communicate with an external apparatus (such as an administrator computer) through network, such as a wireless network, a wired network, a cellular network, a local area network or the Internet, etc.

In one embodiment, the laser soldering system further includes a human-machine interface 43 electrically connected to the control module 10. The human-machine interface 43 may be any combination of display devices (such as a display, a touchscreen, or a projection module) and input devices (such as a mouse, a keyboard, or a touchpad). The human-machine interface 43 is used to receive a data inputted by the user and output an information.

In one embodiment, the laser soldering system further includes a storage module 44 electrically connected to the control module 10, such as a RAM, an EEPROM, a Solid-State Drives, a magnetic disk drives, a flash memory, etc. or any combination thereof, the storage module 44 is used to record data.

In one embodiment, the storage module 44 may store a thermal diffusivity index database 440. The thermal diffusivity index database 440 is established in advance and records a mapping relationship between a plurality of machining data and a plurality of machining parameters 441 respectively adequate to each of the machining data.

In one embodiment, the above-mentioned mapping relationship may be obtained by heating experiments implemented to different soldering targets or by training with a machine learning technique, but this specific example is not intended to limit the scope of the present disclosure.

In one embodiment, the above-mentioned machining data may include a target data of different soldering targets (such as a component to be welded and/or the soldering material), the target data may record a size, a thickness, an area, a material, and/or a thermal diffusivity of the soldering target.

In one embodiment, each of the above-mentioned machining parameters 441 may include an initial lens distance between multiple lenses, and/or different power values outputted by the laser module 11 in different stages, such as a preheating stage, a soldering stage and/or a forming stage.

Therefore, after retrieving the target data of the current soldering target, the laser soldering system may search for one of the machining parameters 441 corresponding to the target data in the thermal diffusivity index database 440, and execute a soldering procedure based on the obtained machining parameter 441 in order to achieve a best heating power control.

In one embodiment, the storage module 44 may store a spot-adjustment condition 442, such as any abnormal status is detected, a timing designated to adjust the light spot size is arrived (such as entering the preheating stage, entering the soldering stage, entering the forming stage, the soldering material is not melted or is melted, etc.), but this specific example is not intended to limit the scope of the present disclosure.

In one embodiment, the storage module 44 may store different adjustment strategies 443 corresponding to different abnormal statuses and/or timings, such as enlarging or narrowing the light spot size (a corresponding lens movement direction may be recorded) and/or the adjusted light spot size (a corresponding lens distances or the positions of the displaceable lens may be recorded).

In one embodiment, the corresponding adjustment strategy 443 may be enlarging the light spot size when the abnormal status is the soldering material melted in the air, narrowing the light spot size when the abnormal status is an unmelted soldering material colliding an electronic pin, narrowing the light spot size when the abnormal status is the soldering material melted into a ball shape, and/or enlarging the light spot size when the abnormal status is the light spot burning a printed circuit board outside the soldering target 2, etc. It should be mentioned that the abnormal status may be recognized by computer vision.

In one embodiment, If the abnormal status is that the sensed temperature of the soldering target is inconsistent with a predetermined soldering temperature (namely, the sensed temperature is too high or too low), and/or the abnormal status is that a temperature difference between an electronic pin temperature and the soldering target (such as pad) temperature is greater than a predetermined soldering temperature difference, the corresponding adjustment strategy 443 may be enlarging the light spot size when the sensed temperature is too high, narrowing the light spot size when the sensed temperature is too low, and/or narrowing the light spot size to increase the heating energy density to provide a higher heating energy to the electronic pin or the pad with a lower temperature when the temperature difference is too larger.

Figure 3:
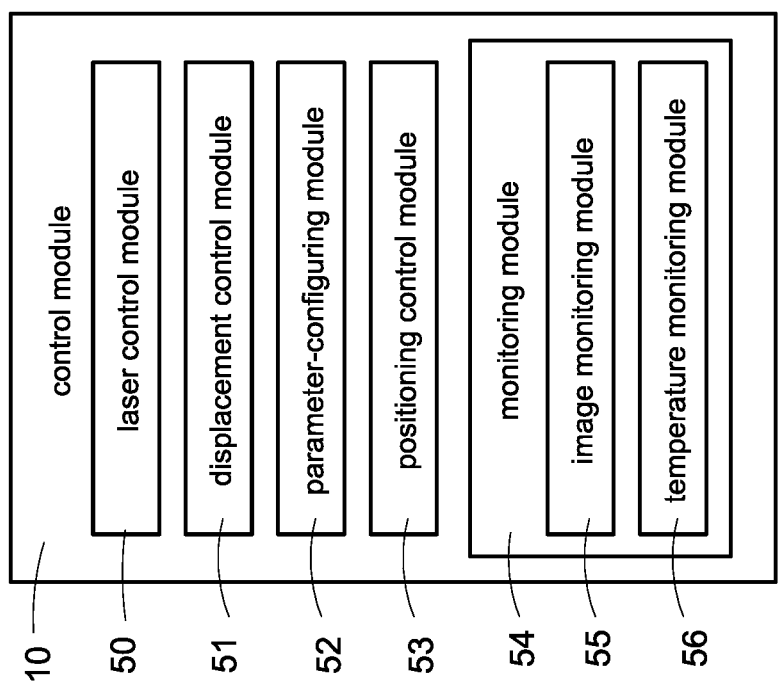
FIG. 3 is an architecture diagram of a control module of one embodiment of the present disclosure.

Please refer to FIG. 1 to FIG. 3 simultaneously, FIG. 3 is an architecture diagram of a control module of one embodiment of the present disclosure. In this embodiment, the control module 10 may include modules 50-56. These modules 50-56 are respectively configured to implement different functions (detailed later).

The above-mentioned modules 50-56 are connected to each other (such as by an electrical connection or an information link), and any of the modules 50-56 may be a hardware module (such as an electronic circuit module, an integrated circuit module, an SoC, etc.), a software module (such as firmware, an operating system, or an application program) or a combination of hardware module and software module, this specific example is not intended to limit the scope of the present disclosure.

Please be noted that when each of the above-mentioned modules 50-56 is the software module, the storage module 440 may include a non-transitory computer-readable media. The non-transitory computer-readable media stores a computer program 445. The computer program 445 records a computer-readable code. When the control module 10 executes the above computer-readable code, the control functions of the above-mentioned modules 50-56 may be implemented.

A laser soldering method of the present disclosure is further descripted, each embodiment of the laser soldering method of the present disclosure may be incorporated with any embodiment of the laser soldering system shown in FIGS. 1-3 and 8-10.

Figure 4:
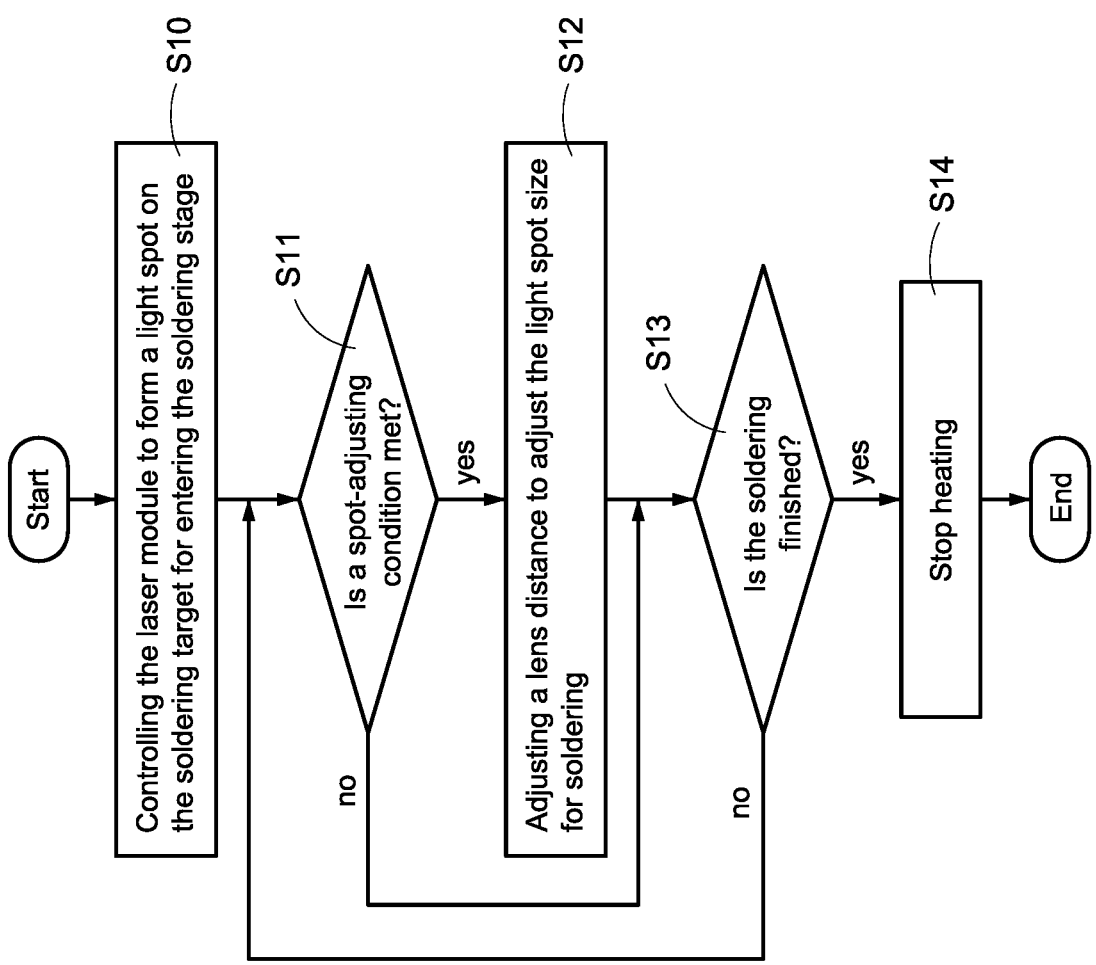
FIG. 4 is a flowchart of a laser soldering method of one embodiment of the present disclosure.

Please refer to FIG. 4, FIG. 4 is a flowchart of a laser soldering method of one embodiment of the present disclosure. The laser soldering method of this embodiment includes the below steps.

Step S10: the control module 10 activates the laser control module 50 to control the laser module 11 to radiate a laser beam toward the laser lens 13 including the first lens and the second lens to form the light spot on the soldering target 2 for entering the soldering stage.

Step S11: the control module 10 activates a monitoring module 54 as disclosed in FIG. 3 to detect whether any of the predetermined spot-adjustment conditions is met in the soldering stage.

When any of the spot-adjustment conditions is met, a step S12 is performed. In step S12, the control module 10 activates the displacement control module 51 to control the electric displacement module 13 to adjust the lens distance between the lenses 130 to adjust the light spot size of the light spot, such as narrowing the light spot size for increasing the heating energy density, or enlarging the light spot size for decreasing the heating energy density.

If none of the spot-adjustment conditions is met, the step S13 is performed.

Step S13: the control module 10 activates the monitoring module 54 to determine whether the soldering is finished, such as determining whether the contact is covered by the molten soldering material.

Step S14: the control module 10 activates the laser control module 50 to control the laser module 11 to stop heating the soldering material, so as to wait for the molten soldering material to be cooled and formed. In one of the embodiments, the control module 10 may enlarge the light spot size for decreasing the heating energy density to slow down the speed of the soldering material in cooling and forming.

The disclosure may provide multiple heating densities respectively adequate to different soldering status via adjusting the light spot size when using the same laser power, thus the soldering quality of the soldering system is improved.

Figure 5:
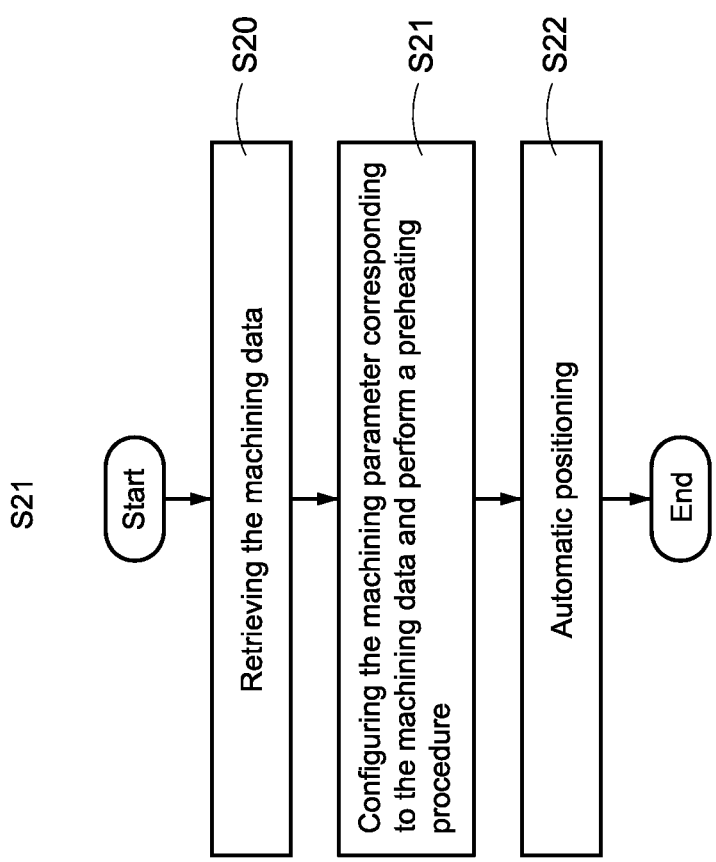
FIG. 5 is a partial flowchart of a laser soldering method of one embodiment of the present disclosure.

Please refer to FIG. 4 and FIG. 5 simultaneously, FIG. 5 is a partial flowchart of a laser soldering method of one embodiment of the present disclosure. In comparison with the laser soldering method of the embodiment according to FIG. 4, the laser soldering method of the embodiment according to FIG. 5 further includes a preheating stage before entering the soldering stage. The preheating stage includes following steps.

Step S20: the control module 10 activates a parameter-configuring module 52 as disclosed in FIG. 3 to retrieve the machining data, such as receiving an input of the human-machine interface 43, or receiving the machining data by the communication interface 42.

Step S21: the control module 10 activates the parameter-configuring module 52 to configure the machining parameter corresponding to the machining data, and activates the laser control module 50 to control the laser module 11 to perform a preheating procedure (i.e., to enter a preheating stage).

In one of the embodiments, the control module 10 searches the machining parameter corresponding to the machining data in the thermal diffusivity index database 440 based on the target data of the machining data.

In one of the embodiments, the above-mentioned machining parameter may include a preheating power for the preheating stage, a soldering power for the soldering stage and/or a forming power for the forming stage. The above-mentioned soldering power may be greater than the preheating power, and the preheating power may be greater than the forming power.

In one of the embodiments, the above-mentioned machining parameter may include an initial light spot size (or an initial lens distance or a lens position corresponding to the initial light spot size), the control module 10 activates the displacement control module 51 to adjust the current light spot size to the initial light spot size.

In one of the embodiments, the above-mentioned preheating procedure may include controlling the lase module 11 to preheat based on the preheating power, such as preheating the soldering target 2 with a lower heating power.

Figure 9:
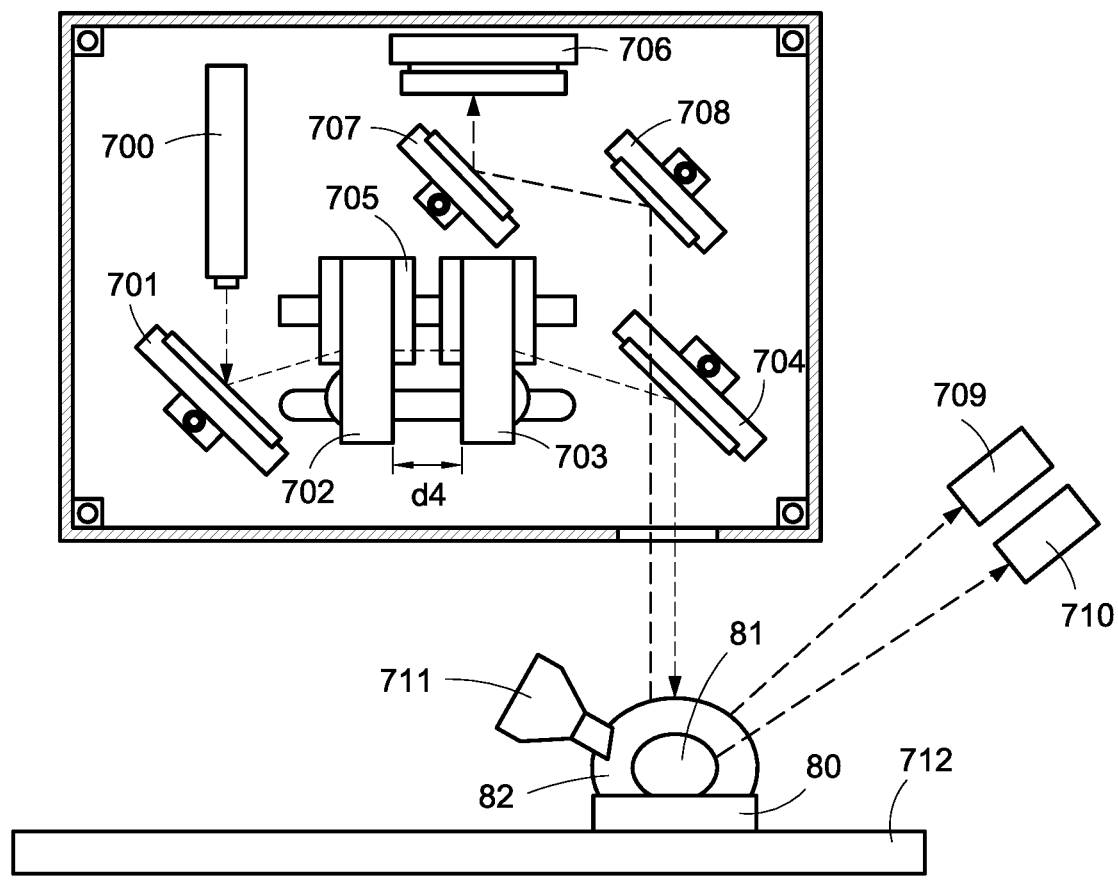
FIG. 9 is a schematic view of a laser soldering of one embodiment of the present disclosure.
Figure 10:
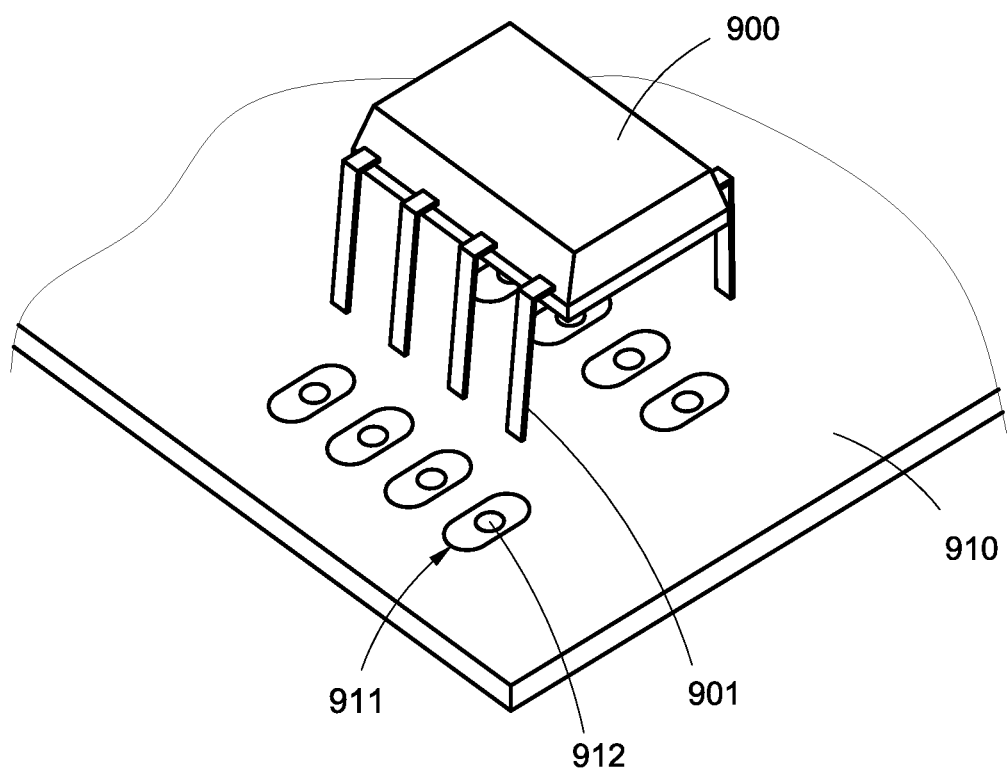
FIG. 10 is a schematic view of a soldering target of one embodiment of the present disclosure.

Step S22: the control module 10 executes a positioning process to ensure that the soldering target 2 is precisely moved to a soldering location (as shown in FIG. 10), and ensure that the extruding device 711 moves the soldering material to the soldering location (as shown in FIG. 9).

In one of the embodiments, the control module 10 may activates an image monitoring module 55 as disclosed in FIG. 3 to control the image capture module 41 to take a plurality of pre-soldering images in a continuous manner by photographing the soldering target 2 continuously, control the extruding device 711 to move the soldering material to the soldering location, and simultaneously activate the positioning control module 53 to execute an automatic positioning procedure through computer vision to detect whether the soldering material arrives the soldering location based on the captured pre-soldering images.

Figure 6:
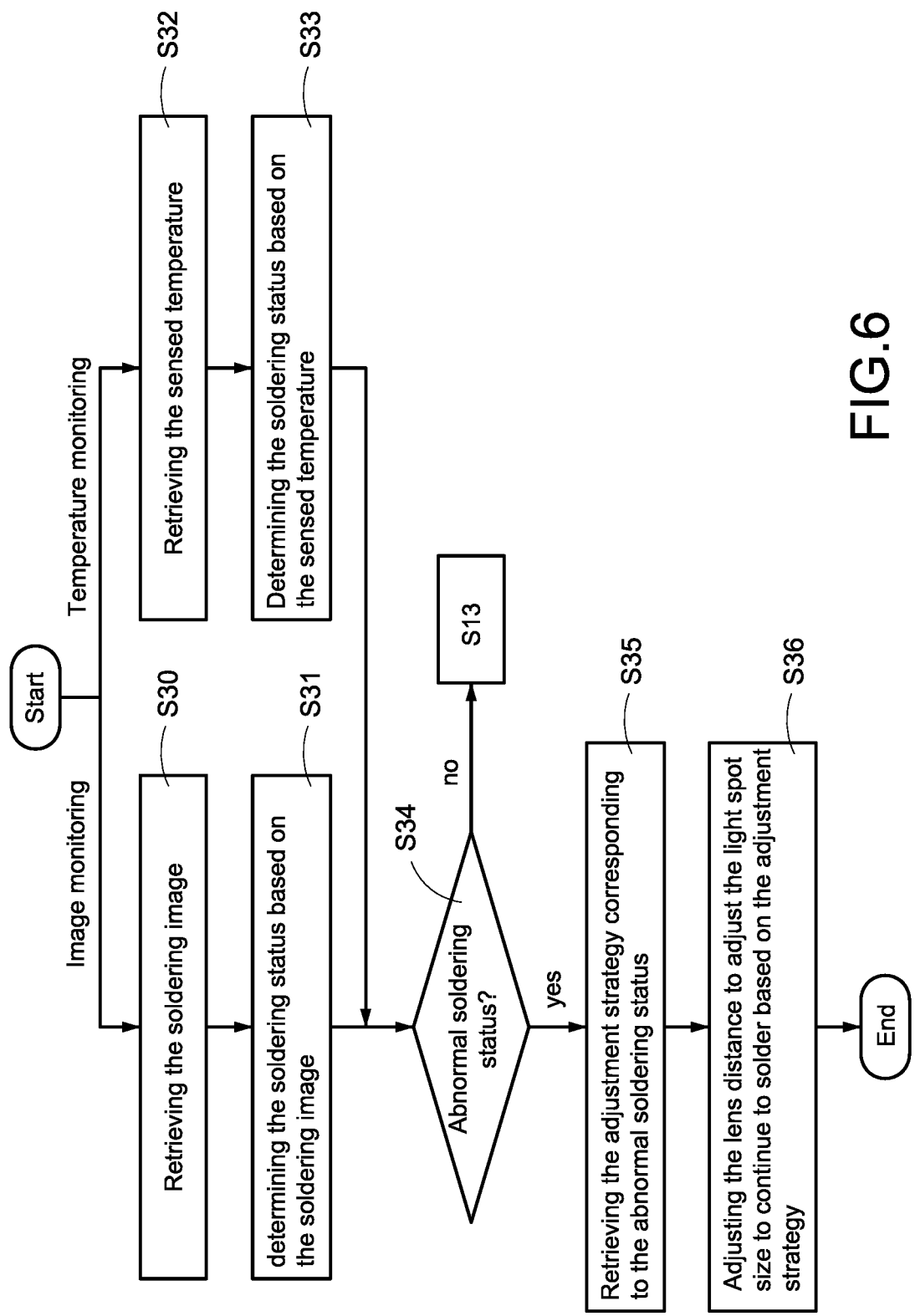
FIG. 6 is a partial flowchart of a laser soldering method of one embodiment of the present disclosure.

Please refer to FIG. 4 to FIG. 6 simultaneously, FIG. 6 is a partial flowchart of a laser soldering method of one embodiment of the present disclosure. In comparison with the laser soldering method of the embodiment according to FIG. 4, the steps S11 and S13 of the laser soldering method of the embodiment according to FIG. 6 further include the below monitoring steps in the soldering stage.

In this embodiment, the control module 10 may perform the steps S30-S31 to recognize the current soldering status based on computer vision (image monitoring).

Step S30: the control module 10 activates the image monitoring module 55 to control the image capture module 41 to take a plurality of soldering images in a continuous manner by photographing the soldering target 2 continuously.

Step S31: the control module 10 activates the image monitoring module 55 to recognize the soldering status of the soldering target 2 based on the captured soldering images, such as determining the soldering status by using an image feature recognition, a machine learning technique, or the other image analysis method.

In one of the embodiments, in the soldering stage, the control module 10 may activates the image monitoring module 55 to analyze the status of the soldering material while the soldering material is melting and flowing through the continuous images, so as to determine the soldering status, such as determining whether the temperature is too high or too low.

In this embodiment, the control module 10 may perform the steps S32-S33 to recognize the current soldering status based on a temperature-sensing procedure (temperature monitoring).

Step S32: the control module 10 activates a temperature monitoring module 56 to retrieve the sensed temperature of the soldering target 2 from the temperature-sensing module 40.

Step S33: the control module 10 activates the temperature monitoring module 56 to determine the soldering status of the soldering target 2 based on the sensed temperature, such as determining whether the temperature is too high or too low, or the temperature difference is too large.

In one of the embodiments, in the soldering stage or the forming stage (i.e., waiting for the soldering contact to be cooled down), the control module 10 may respectively measure the temperatures (or the temperature difference) of the pad and the electronic pin to determine which one has a lower temperature, and narrow the light spot size for increasing the heating energy density to provide a higher heating energy to the one having the lower temperature for increasing its heating speed and temperature.

Step S34: the control module 10 activates the monitoring module 54 (including the image monitoring module 55 and the temperature monitoring module 56) to detect whether the soldering status is recognized as an abnormal soldering status.

Step S35: the control module 10 activates the monitoring module 54 to retrieve the adjustment strategy 443 corresponding to the abnormal soldering status.

Step S36: the control module 10 activates the displacement control module 51 to adjust the lens distance between the lenses 130 of the laser lens 13 to adjust the light spot size formed on the soldering target 2 based on the retrieved adjustment strategy 443.

Thus, the present disclosure may automatically recognize the soldering status through image monitoring or temperature monitoring, and automatically adjust the light spot size to eliminate the abnormal soldering status.

Please refer to FIG. 4 to FIG. 7, FIG. 7 is a partial flowchart of a laser soldering method of one embodiment of the present disclosure. In this embodiment, the storage module 44 further stores a learning model 444 as disclosed in FIG. 2 for executing an image recognition and an image classification.

Figure 7:
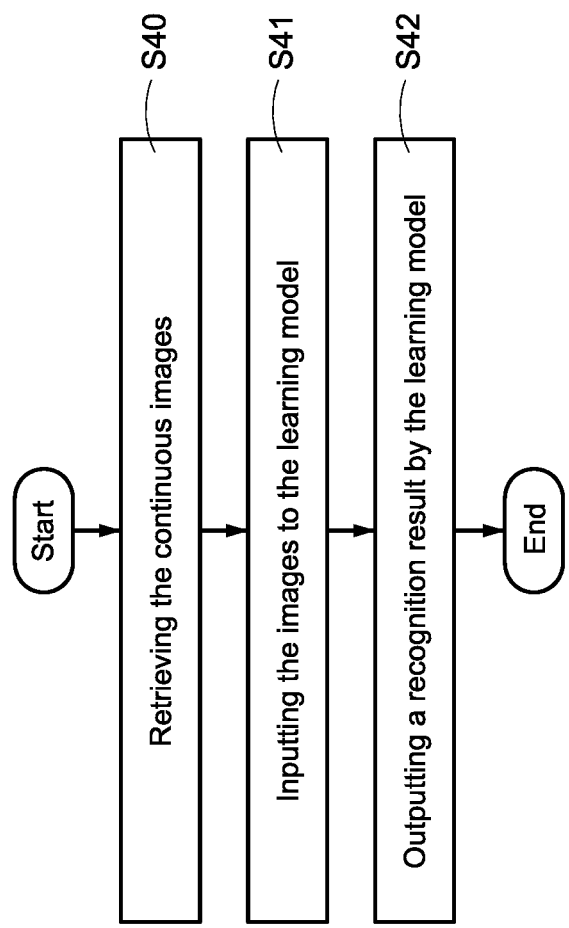
FIG. 7 is a partial flowchart of a laser soldering method of one embodiment of the present disclosure.

The step S31 of the laser soldering method of the embodiment according to FIG. 6 further includes the below steps as shown in FIG. 7 to recognize the soldering status based on the continuous images.

Step S40: the control module 10 activates the image monitoring module 55 to retrieve the multiple images in a continuous manner, such as the above-mentioned soldering images or pre-soldering images.

Step S41: the control module 10 activates the image monitoring module 55 to input the multiple images to the learning model 444 in order to obtain the soldering status through the learning model 444.

In one of the embodiments, the learning model 444 is generated by training a machine learning algorithm with the soldering images corresponding to the abnormal soldering status.

In one of the embodiments, the learning model 444 includes a plurality of built-in target data of various soldering statuses, and enables to recognize various abnormal statuses of the soldering target 2 (such as a size of a pad) in the soldering stage.

In one of the embodiments, the learning model 444 may recognize the light spot size. More specifically, an image filtered by an infrared paper jam (or an infrared filter) is passing through a low-pass filter to generated a filtered image, and then an image binarization is executed on the filtered image to generate a binary image. Finally, the light spot size may be computed by analyzing the binary image.

In one of the embodiments, the learning model 444 includes a 3D CNN (Convolutional Neural Network) or a ConvLSTM (Convolutional Long Short-Term Memory) deep learning model.

In one of the embodiments, the control module 10 activates the image monitoring module 55 to first merge the continuous images into one image, and input the merged image to the learning model 444, so the learning model 444 may analyze a movement vector of an object in the continuous images.

Step S42: the learning model 444 outputs a recognition result indicating the soldering status corresponding to the inputted continuous images.

The present disclosure uses the machine learning technique to recognize the soldering status based on continuous images, which can greatly improve the recognition speed and accuracy.

Figure 8:
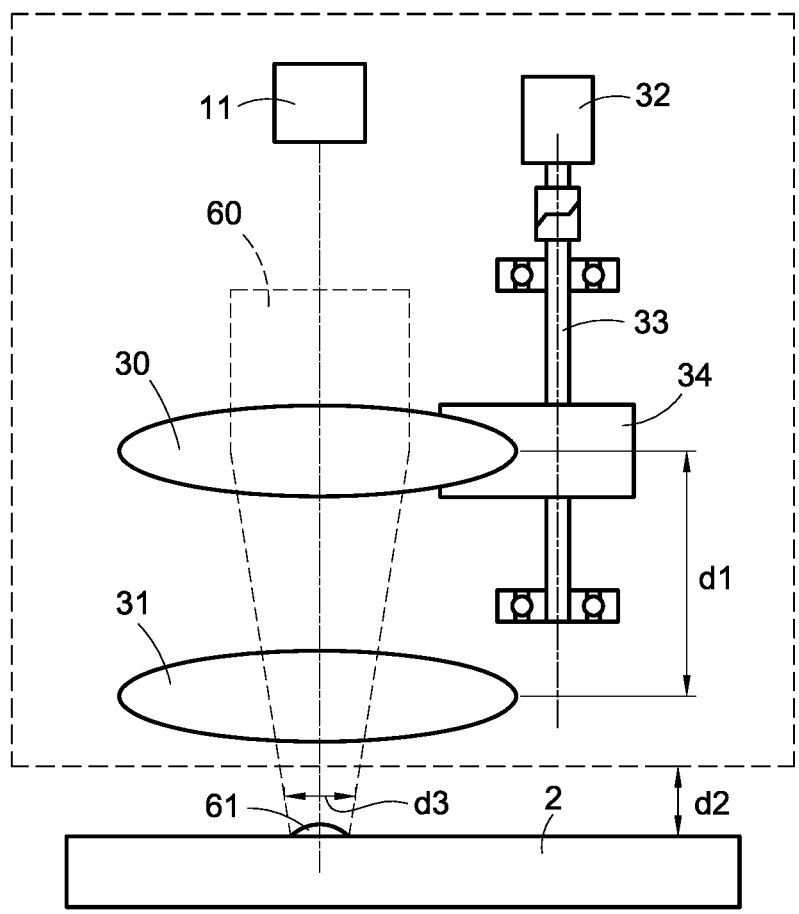
FIG. 8 is a schematic view of a laser soldering of one embodiment of the present disclosure.

Please refer to FIG. 8, FIG. 8 is a schematic view of a laser soldering of one embodiment of the present disclosure. In this embodiment, a laser beam 60 radiated by the laser model 11 is passing through the displaceable lens 30 and the non-displaceable lens 31 (where a lens distance D1 exists between the displaceable lens 30 and the fixed lens 31), and a light spot 61 is formed on the soldering target 2 (where the light spot 61 has a light spot size d3). There is a fixed distance d2 between the optical system and the soldering target 2.

To adjust the light spot size of the light spot 61, the electric motor 32 operates to gear the displacement component 33 (such as a guideway) to move upward or downward, and the lens stage 34 with the displaceable lens 30 is moved accordingly. Thus, the light spot size d3 is adjusted by changing the lens distance d1.

Please refer to FIG. 9, FIG. 9 is a schematic view of a laser soldering of one embodiment of the present disclosure. A laser module 700 is disclosed in FIG. 9. In this embodiment, the optical system of the laser module 700 is a zoom system, and includes a reflecting mirror 701, displaceable lenses 702-703, and a reflecting mirror 704. Moreover, by controlling an electric displacement module 705, a lens distance d4 between the displaceable lenses 702-703 may be adjusted, and then the focal length and the light spot size of the laser beam radiated from the laser module 700 may be adjusted.

In one of the embodiments, an adjustable range of the lens distance d4 is within 35 mm to 45 mm, and a corresponding adjustable range of the light spot size is 0.8 mm to 3 mm, but this specific example is not intended to limit the scope of the present disclosure.

In one of the embodiments, the laser soldering system includes a forward camera 706, an optical system of the forward camera 706 includes reflector mirrors 707-708. By the arrangement of the reflector mirrors 707-708, the forward camera 706 is capable of taking an overhead image of the soldering target by looking down.

In one of the embodiments, the laser soldering system includes a side camera 709 used to take a side-view image of the soldering target.

In one of the embodiments, the laser soldering system includes a laser thermometer 710 used to sense a temperature of the soldering target.

In one of the embodiments, the soldering target is placed on a soldering station 712, and the soldering target includes a pad 80 disposed on a printed circuit board, an electronic pin 81, and a soldering material 82 covering the pad 80 and the electronic pin 81.

In one of the embodiments, the laser soldering system includes an extruding device 711, the extruding device 711 may be controlled by the control module 10 to move the soldering material 82 to the soldering location of the pad 80.

Please refer to FIG. 10, FIG. 10 is a schematic view of a soldering target of one embodiment of the present disclosure. The present disclosure may be applied to a soldering and a pad. In this embodiment, pins 901 of an electronic component 900 are inserted into holes 912 of pads 911 in alignment, and a tin wire is used as the soldering material to soldering to electrically fixed the pins 901 on the pads 911 of a printed circuit board 910.

Figure 11:
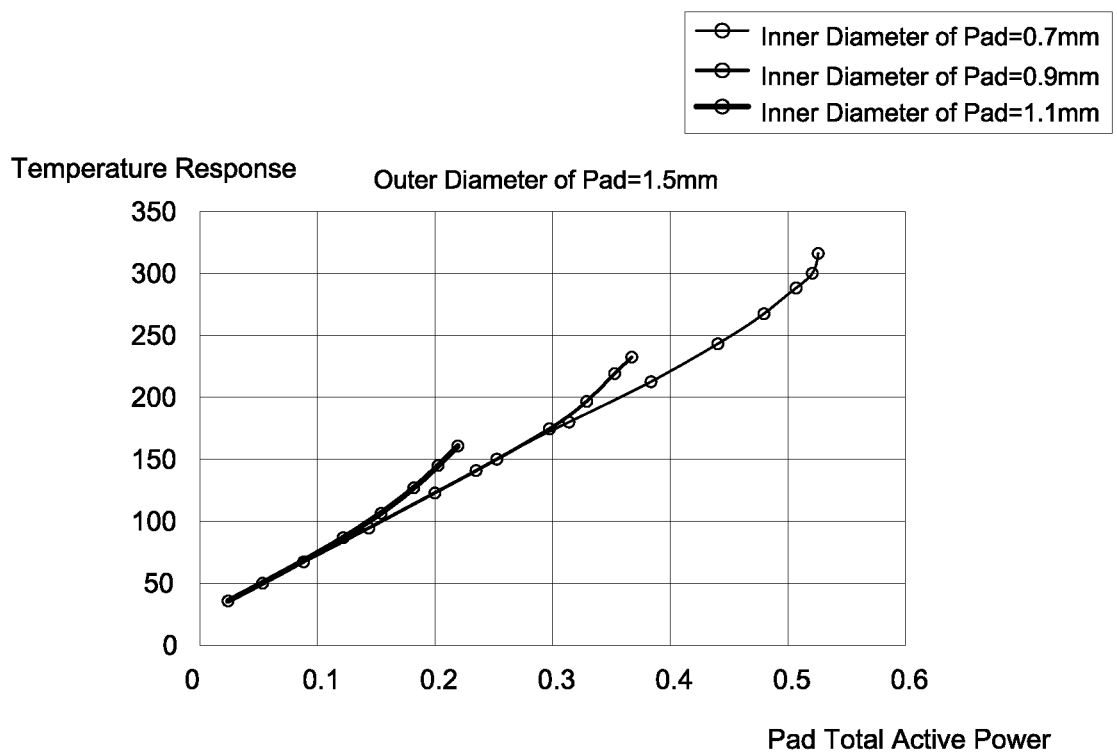
FIG. 11 is a curve chart of Pad Total Active Power versus Temperature Response of one embodiment of the present disclosure.
Figure 12:
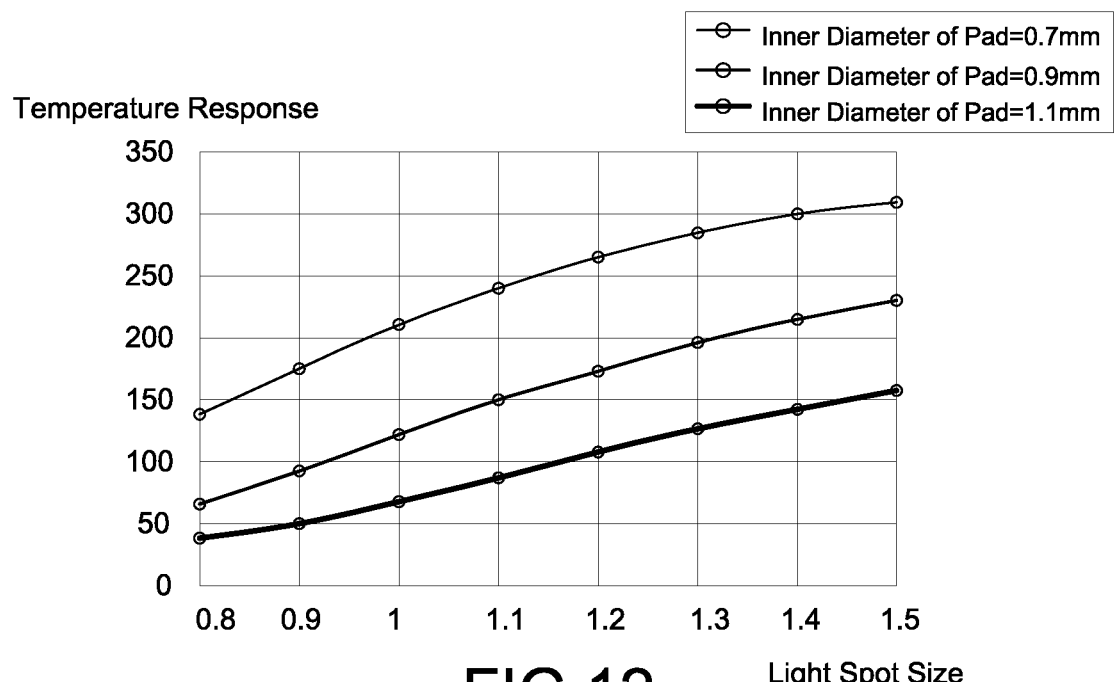
FIG. 12 is a curve chart of Light Spot Size versus Temperature Response of one embodiment of the present disclosure.
Figure 13:
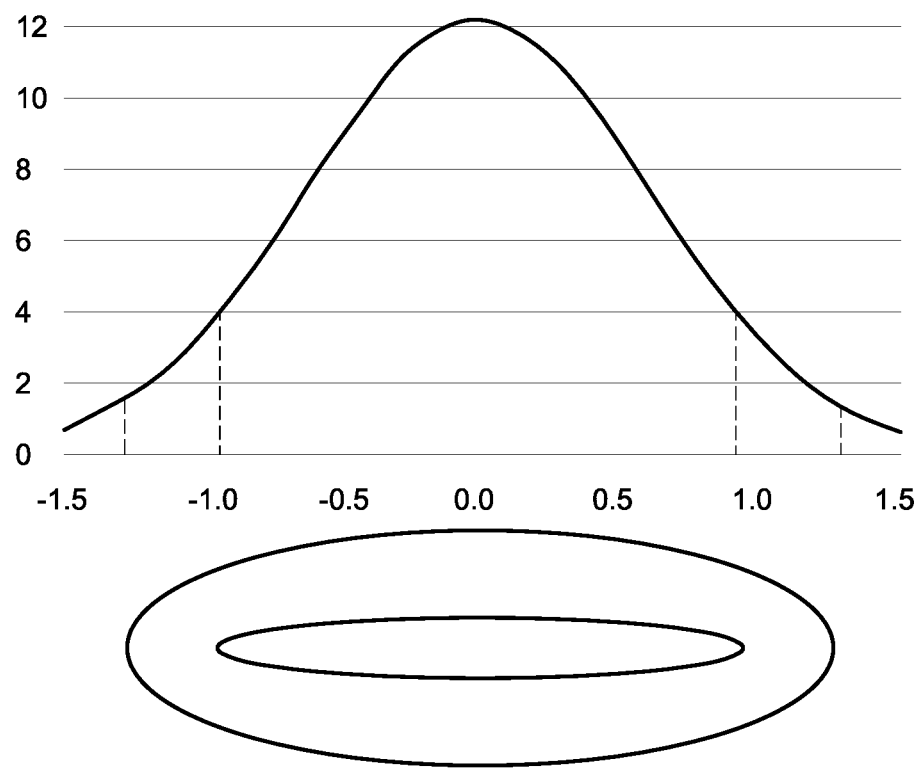
FIG. 13 is a curve chart of Pad Position versus Active Power of one embodiment of the present disclosure.

Please refer to FIG. 11 to FIG. 13 simultaneously, FIG. 11 is a curve chart of Pad Total Active Power versus Temperature Response of one embodiment of the present disclosure, FIG. 12 is a curve chart of Light Spot Size versus Temperature Response of one embodiment of the present disclosure, and FIG. 13 is a curve chart of Pad Position versus Active Power of one embodiment of the present disclosure.

To a general soldering component (i.e., a soldering target), the heating energy density becomes lower and the temperature response becomes worser (lower temperature) when the light spot size is enlarged.

However, the laser beam distributes energy in Gaussian form, namely, the energy from the middle of the laser beam is higher than that from the outer of the laser beam. If the soldering target is a component having a hole (such as a pad), the result is that most of the heating power is received by the hole, and only a small amount of heating power is received by the pad.

Please refer to FIG. 13, take a total output power of 10 W for an example, the power received by the pad may only be three to four watts, and most of the heating power is active on the hole. This is a waste of energy.

Please refer to FIG. 11, the total acting power becomes higher and the temperature response becomes better (namely, it is faster to heat up) when a receiving area is increased due to the reduction of an inner diameter of the pad.

Please refer to FIG. 12, in order to adapt to the above characteristics of the soldering target having one or more holes such as the pad, the present disclosure may timely enlarge the light spot size to increase an illuminated area of the pad, thereby improving the temperature response.

While this disclosure has been described by means of specific embodiments, numerous modifications and variations could be made thereto by those skilled in the art without departing from the scope and spirit of this disclosure set forth in the claims.

What is claimed is:

1. A laser soldering system using dynamic light spot, comprising:
    a laser lens, comprising a first lens and a second lens;
    an electric displacement module, connected to at least one of the first lens and the second lens, the electric displacement module being controlled to move to adjust a lens distance between the first lens and the second lens;
    a laser module, used to radiate a laser beam toward the laser lens to form a light spot on a soldering target behind the laser lens;
    a control module, electrically connected to the laser module and the electric displacement module, the control module being configured to control the laser module to radiate, and control the electric displacement module to adjust the lens distance between the first lens and the second lens to adjust a light spot size of the light spot based on a spot-adjustment condition when the spot-adjustment condition is met in a soldering stage; and
    an image capture module, electrically connected to the control module, used to photograph the soldering target; and
    an extruding device, electrically connected to the control module, used to provide a soldering material to a pad of a printed circuit board to be the soldering target;
    wherein the control module comprises an image monitoring module, configured to receive a plurality of pre-soldering images of the soldering target in a continuous manner from the image capture module, and executes an automatic positioning procedure on the plurality of pre-soldering images to detect whether the soldering material arrives the soldering location;
    wherein the control module is configured to control the extruding device to move the soldering material to a soldering location of the pad based on a detection result of the image monitoring module.

2. The laser soldering system of claim 1, further comprising a human-machine interface electrically connected to the control module, the human-machine interface being used to receive an operation of inputting a machining data;
    wherein the control module comprises:
    a parameter-configuring module, configured to configure a machining parameter based on the machining data before the soldering stage; and
    a laser control module, configured to control the laser module to preheat in a preheating stage and control the laser module to heat based on the machining parameter in the soldering stage.

3. The laser soldering system of claim 2, further comprising a thermal diffusivity index database, connected to the control module, the thermal diffusivity index database being recording a mapping relationship between a plurality of machining data and a plurality of machining parameters, the machining data comprising a target data recording at least one of a size, a thickness, an area, a material, and a thermal diffusivity of the soldering target;
    wherein the parameter-configuring module is further configured to search one of the machining parameters corresponding to the target data in the thermal diffusivity index database, the searched machining parameter comprises an initial lens distance between the first lens and the second lens, and multiple power values outputted by the laser module in different stages;
    wherein the control module is configured to control the laser module to preheat based on a preheating power in the preheating stage, and control the laser module to soldering based on a soldering power in the soldering stage, wherein the soldering power is different from the preheating power.

4. The laser soldering system of claim 1, further comprising:
    the image capture module, electrically connected to the control module, used to obtain a plurality of soldering images in a continuous manner by photographing the soldering target continuously; and
    a learning model, configured by training a machine learning algorithm with the soldering images corresponding to the soldering status identified to be abnormal;
    wherein the control module comprises:
    the image monitoring module, configured to determine the soldering status of the soldering target based on the soldering images, and retrieve an adjustment strategy corresponding to the soldering status of the soldering target when the soldering status is determined to be abnormal; and
    a displacement control module, configured to adjust the lens distance between the first lens and the second lens to adjust the light spot size focused on the soldering target based on the adjustment strategy;
    wherein the image monitoring module is configured to input the soldering images in the continuous manner to the learning model to obtain the soldering status.

5. The laser soldering system of claim 1, further comprising a temperature-sensing module, electrically connected to the control module, used to sense a sensed temperature of the soldering target;
    wherein the control module comprises:
    a temperature monitoring module, configured to retrieve an adjustment strategy corresponding to the soldering status when the soldering status is detected to be abnormal based on the sensed temperature, and compute an adjustment distance based on the adjustment strategy; and
    a displacement control module, configured to control the electric displacement module to adjust the lens distance between the first lens and the second lens to the adjustment distance to adjust the light spot size on the soldering target.

6. The laser soldering system of claim 1, wherein the spot-adjustment condition comprises at least one of:
    a soldering material melted in the air;
    an unmelted soldering material colliding an electronic pin;
    the soldering material melted into a ball shape; and
    the light spot burning to a printed circuit board outside the soldering target;
    a sensed temperature of the soldering target being inconsistent with a predetermined soldering temperature;
    a temperature difference between an electronic pin temperature and a pad temperature of the soldering target being greater than a predetermined soldering temperature difference;
    wherein the control module is configured to:
    adjust the lens distance to enlarge the light spot size for decreasing a heating energy density when the soldering material is melted in the air;

adjust the lens distance to narrow the light spot size for increasing the heating energy density when the unmelted soldering material collides the electronic pin;

adjust the lens distance to narrow the light spot size for increasing the heating energy density when the soldering material is melted into the ball shape;

adjust the lens distance to enlarge the light spot size for decreasing the heating energy density when the light spot burns the printed circuit board;

adjust the lens distance to enlarge the light spot size for decreasing the heating energy density when the sensed temperature is greater than the predetermined soldering temperature;

adjust the lens distance to narrow the light spot size for increasing the heating energy density when the sensed temperature is less than the predetermined soldering temperature; and adjust the lens distance to narrow the light spot size for increasing the heating energy density to provide a higher heating energy to the electronic pin or the pad with a lower temperature when the temperature difference is greater than the predetermined soldering temperature difference.

7. The laser soldering system of claim 1, further comprising a storage module, used to store a mapping relationship between a plurality of experimental distances and a plurality of experimental sizes;

wherein the control module is configured to determine at least one of the experimental distances by searching the mapping relationship based on the light spot size and an adjustment strategy corresponding to the spot-adjustment condition being met, and adjust the lens distance to the at least one of the experimental distances.

8. The laser soldering system of claim 1, wherein the electric displacement module comprises:

at least one lens stage, each lens stage being used to arrange the first lens or the second lens;

a displacement component, used to move the lens stage to adjust the lens distance between the first lens and the second lens when receiving a motive power; and an electric motor, used to provide the motive power to the displacement component.

9. The laser soldering system of claim 8, wherein at least one of the first lens and second lens is converging lens;

wherein the displacement component comprises a slideway device or a guideway device, the displacement component is configured to adjust the lens distance to increase or decrease a length of an optical path of the laser module in a direction parallel to the optical path.

* * * * *